United States Patent [19]
Clements

[11] 4,313,609
[45] Feb. 2, 1982

[54] SEALING DEVICES

[76] Inventor: Harold J. Clements, 20 St. Michaels Close, Canterbury, Kent, England

[21] Appl. No.: 168,499

[22] Filed: Jul. 14, 1980

[30] Foreign Application Priority Data

Jul. 16, 1979 [GB] United Kingdom ............ 24673/79

[51] Int. Cl.³ .................. B65D 53/04; F16J 15/02
[52] U.S. Cl. ............................. 277/34.3; 277/199; 277/237 R
[58] Field of Search .......... 277/34, 34.3, 237 R, 277/199; 220/77, 67, 48

[56] References Cited
U.S. PATENT DOCUMENTS 4,222,576 9/1980 Clements .

FOREIGN PATENT DOCUMENTS 2904636 8/1979 Fed. Rep. of Germany .
2416405 2/1979 France .
 409555 1/1965 Switzerland .
1061302 3/1967 United Kingdom .

Primary Examiner—Robert I. Smith
Attorney, Agent, or Firm—Bacon & Thomas

[57] ABSTRACT

A sealing device comprising two interengageable elongate seal members, of which at least one is flexible and has an internal void extending along the length thereof, said one member being arranged to deform so as sealingly to engage the other seal member when said void is at least partially evacuated with the seal members interengaged.

9 Claims, 13 Drawing Figures

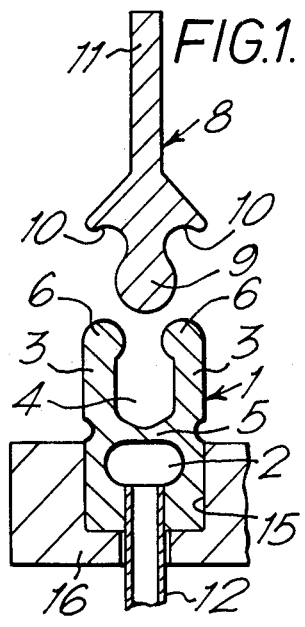
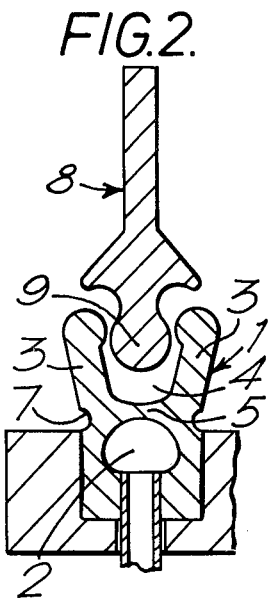
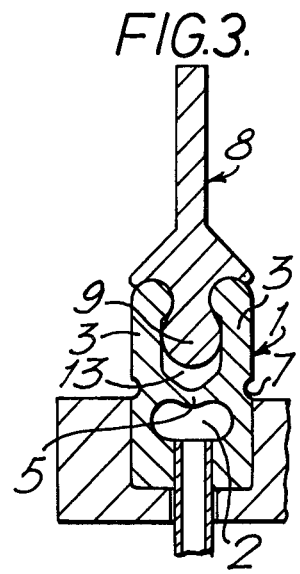
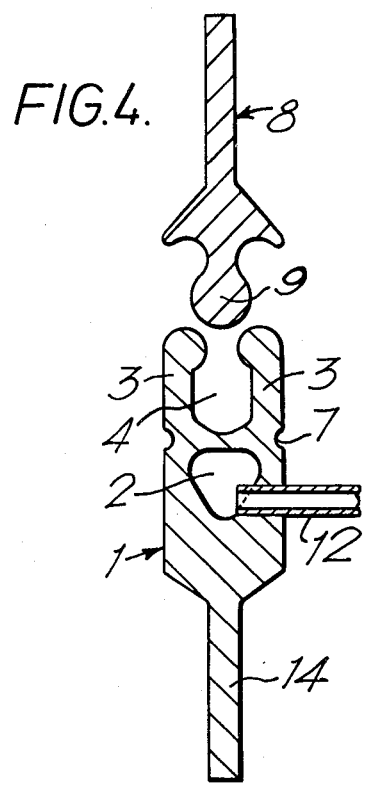
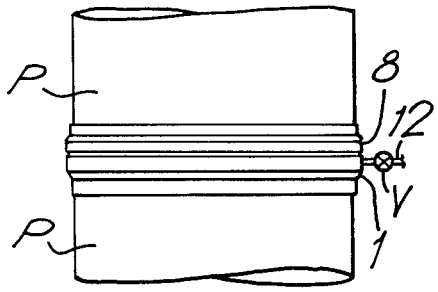

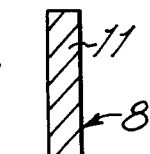
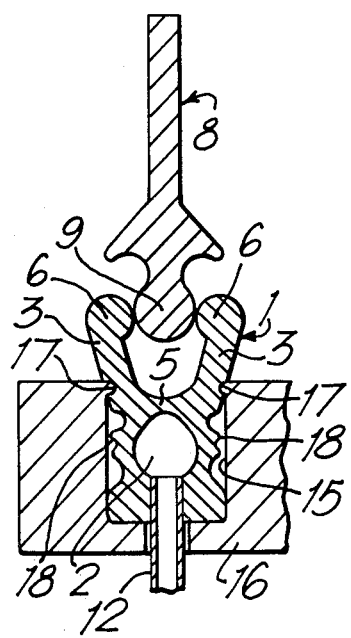
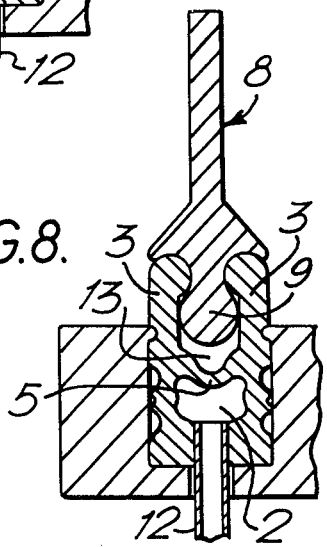
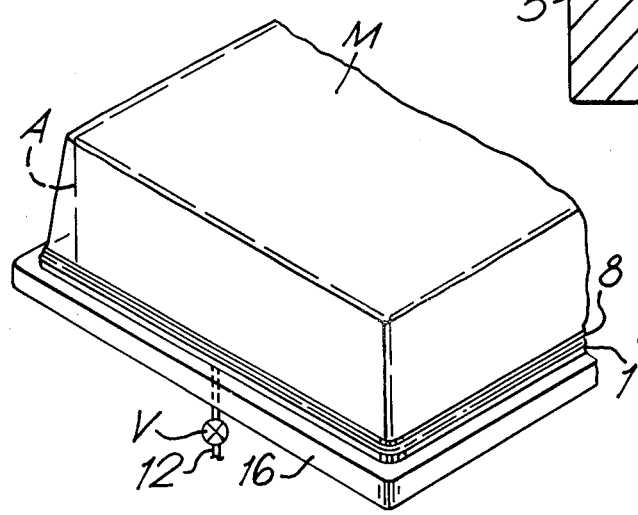

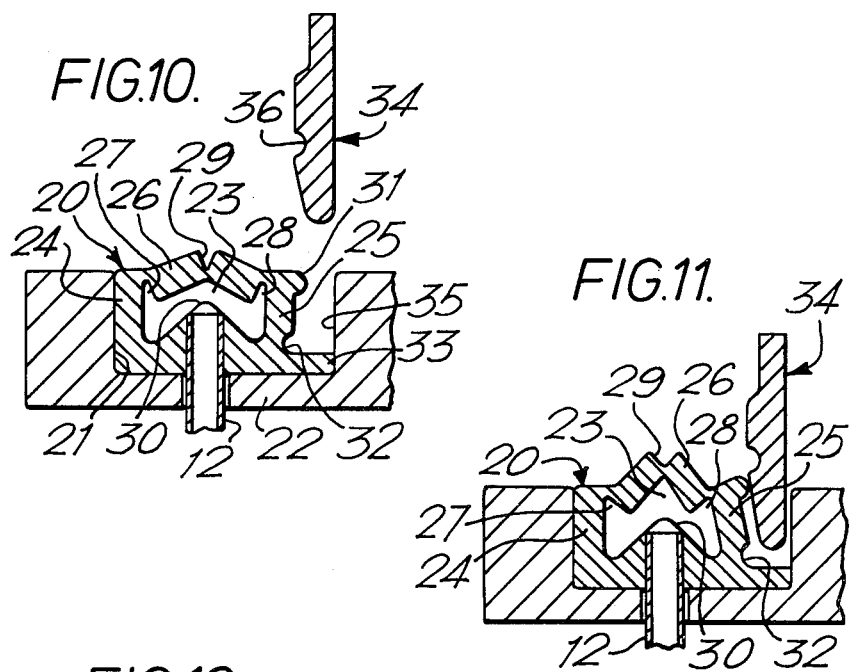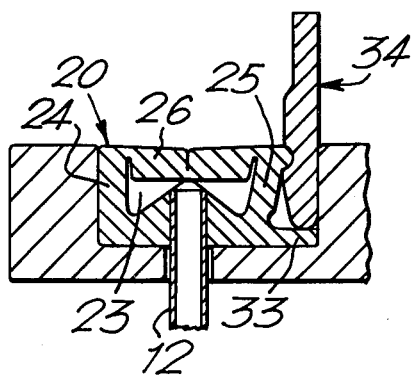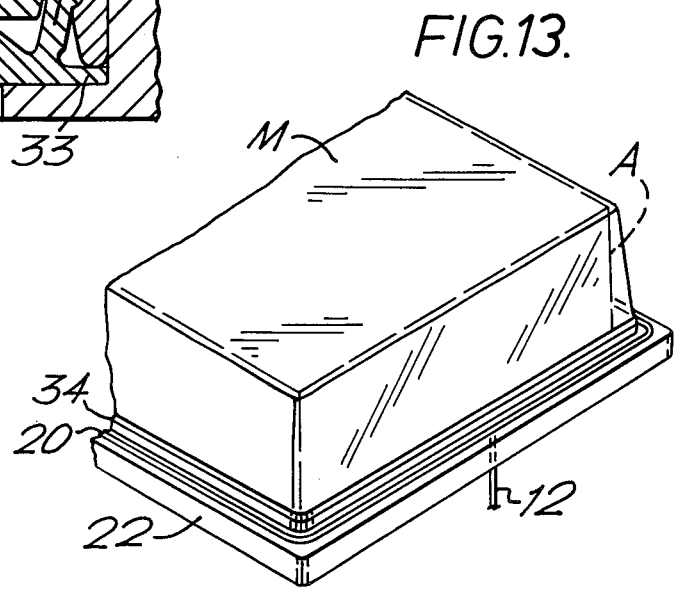

SEALING DEVICES

The present invention relates to a sealing device for sealing together two articles, or for sealing an opening in an article, along an elongate joint.

In the past, such seals have been effected by various means including clamped seals, resilient bands, pneumatic seals, sealed type zip-fasteners and other mechanically operated closures with various degress of efficacy and operational convenience.

It is known, also, that efficient sealing of jars, cans and other enclosed vessels may be effected by the practice of introducing a sub-atmospheric pressure (or 'vacuum') within the vessel so as to cause the lid or cap of the vessel to impinge with intimate pressure upon the joined rim surfaces of the respective components and thereby to create a pressure seal.

It is important to note in this connection that:
(a) the vacuum-seal closure as described above is dependent upon a pressure depression applied to the contained volume within the vessel,
(b) the closure system, as described, is dependent upon adequate rigidity of the joined components when in the sealed state.

The present invention sets out to provide a sealing device particularly but not exclusively suitable for sealing gas or liquid tight or weatherproof enclosures wherein it is advantageous to utilize a flexible seal arrangement for reasons of convenience, economy or technical adaptability, or wherein one or more component members of such enclosure structure is constructed from flexible sheet material of impermeable nature which is required to be readily detachable from associated components of the said enclosure structure. Particular applications include:
(a) the connection of airtight flexible envelopes comprising a plurality of separable components;
(b) the jointing of rigid structures such as lengths of piping, allowing a degree of flexibility at the joints;
(c) the securing of flexible components to rigid components in an airtight manner; and
(d) rim closure for doors, shutters, etc., where airtightness or weatherproofing is an important requirement.

My co-pending application Ser. No. 009790 filed Feb. 6, 1979 describes and claims a sealing device comprising two interengageable elongate members of which at least one has a resilient sealing surface extending therealong for sealing engagement with the other member, the two members being arranged to define a substantially enclosed space extending lengthwise therebetween when they are interengaged, and means associated with one of the members for evacuating said space so as to cause sealing engagement of the two members along their lengths.

Whilst such a sealing device has been found to provide a good seal and to be useful in a wide variety of applications, the maintenance of a reduced pressure in the said enclosed space to effect the seal is itself dependent on the sealing engagement of the two members. In some circumstances, this is not desirable.

According to the present invention there is provided a sealing device comprising two interengageable elongate seal members, of which at least one is flexible and has an internal void extending along the length thereof, said one seal member being arranged to deform so as sealingly to engage the other seal member when said void is at least partially evacuated with the seal members interengaged.

In a preferred form of the invention, said one seal member is arranged to disengage said other seal member, so as to facilitate engagement and disengagement of the seal members, when a positive pressure is produced in said void.

Whilst it is preferred that the elongate seal members are endless, this is not essential, provided adequate sealing means are provided at each end of the device.

If the said other elongate seal member is also flexible, a flexible joint is formed. Alternatively, the other elongate seal member may be rigid or semirigid. Suitable flexible materials include rubber and rubber-like polymers, optionally including reinforcing means, such as fabric or fibrous reinforcement.

The elongate seal members may have cross-sections such that an initial interlocking occurs when the seal members are engaged with one another so as to secure the seal members together while the subsequent step of evacuating the void takes place.

In one form of the invention, said other elongate seal member comprises the rim around the opening of a rigid or semi-rigid vessel. Said one elongate seal member which engages the rim of the vessel may be provided on a flexible sheet member adapted to close the opening.

A pair of sealing devices according to the invention may be used to provide a jointing ring or band for connecting two objects together. The ring or band may be flexible or rigid as required. One example of such an arrangement is a ring having flexible elongate seal members at each axial end thereof, which could be used to join together, for example, two impermeable pipes.

In a further preferred arrangement, said one seal member is arranged to be accommodated in a channel in a rigid or semi-rigid component. The said seal member may then be arranged to be urged into sealing engagement with the walls of the channel in the interengaged configuration of the sealing device. In another embodiment in which said one seal member is accommodated in a channel, said other seal member may be engaged between a portion of said one member and a wall of the channel, rather than between two portions of said one member. The walls of said one seal member may include portions of reduced thickness at which portions the walls have increased flexibility. By this means, the behaviour of said one seal member when the pressure in said void is increased or decreased can be favourably influenced.

In another preferred arrangement, the evacuation of said void operates an over-centre arrangement forming part of said one seal member which then locks said one member in the position in which said other seal member is sealingly engaged. Then, even if the vacuum in said void is released, the two seal members remain locked together, and only upon application of positive pressure to said void are the two members separable.

Some embodiments of the invention will now be described by way of example and with reference to the accompanying drawings, in which:

FIG. 1 is a section through the two elongate members of a first embodiment of the present invention, with one of such members mounted in a channel in one of two parts which are to be sealed together;

FIG. 2 shows the two members of FIG. 1 about to be interengaged;

FIG. 3 shows the two members of FIGS. 1 and 2 fully interengaged after a vacuum has been drawn;

FIG. 4 is a section through a second embodiment of the present invention;

FIG. 5 is a view of two parts, specifically two flexible pipe sections, interconnected by means of the sealing device of FIG. 4;

FIG. 6 is a section through the two elongate members of a third embodiment of the invention, again with one of such members shown mounted in a channel in one of two parts which are to be sealed together;

FIG. 7 shows the two members of FIG. 6 about to be interengaged;

FIG. 8 shows the two members of FIGS. 6 and 7 fully interengaged after a vacuum has been drawn;

FIG. 9 is a view of an enclosure comprising a rigid base and a flexible cover sealed together by means of the sealing device of either FIGS. 1 to 3 or FIGS. 6 to 8.

FIG. 10 is a section through a fourth embodiment of the invention, showing the two elongate members, one of which is again mounted in a channel in one of two parts which are to be sealed together;

FIG. 11 shows the two members of FIG. 10 about to be interengaged;

FIG. 12 shows the two members of FIGS. 10 and 11 fully interengaged after a vacuum has been drawn; and FIG. 13 is a view similar to FIG. 9 but illustrating the use of the device of FIGS. 10 to 12.

As shown in FIGS. 1 to 3, a sealing device comprises an elongate female seal member 1 formed of a flexible and impermeable material, for example, rubber or a rubber-like polymer. The member 1 has an internal void 2 therein, extending the length thereof. The void 2 is substantially oval in cross-section, the major axis of the oval being normal to the vertical axis of the section (as illustrated). The seal member further comprises two side walls 3, defining a recess 4, the recess 4 being separated from the void 2 by a web 5. Each side wall 3 is provided with a rounded, inwardly extending lip 6 at its free end. The web 5 tapers symmetrically from each side wall 3 to a minimum on the vertical axis of the section. A rounded notch 7 is provided on each side of the member 1 at the base of the side walls 3. A conduit 12 is provided at at least one point along the length of the member 1 to allow fluid communication with the void 2 through a rigid or semi-rigid and impermeable base member 16 formed with a rectangular-section channel 15 in which the member 1 makes a close fit.

An elongate male seal member 8 which may be either rigid or flexible comprises a rounded head 9 having two re-entrant shoulders 10 at the base thereof and a jointing flange 11 for joining the seal member to a part such as a flexible membrane which is to provide an impermeable cover for one or more articles to be placed on the base 16.

In order to interengage the two seal members, a positive pressure is supplied to the void 2 through the conduit 12, thus distending the web 5 and pivoting the two side walls 3 apart, as shown in FIG. 2. In this position the head 9 of the member 8 can be inserted between the lips 6, until the lips 6 engage the shoulders 10. To attain this position, the side walls 3 pivot about their bases, this pivoting movement being facilitated by the notches 7.

After this preliminary engagement of the members 1 and 8, the pressure in the void 2 is reduced, and as a sub-atmospheric pressure is produced, the centre of the web 5 is drawn downwardly, thus tending to pivot the side walls 3 inwardly about their bases so that the lips 6 are forced towards the vertical axis of the member 1, thus firmly engaging the re-entrant portions on the seal member 8 between the head 9 and the shoulders 10. As a consequence of the downward movement of the web 5, a sub-atmospheric pressure will be produced in the volume 13 between the members 1 and 8, thereby enhancing the grip of the walls 3 and lips 6 upon the member 8.

The depression in the void 2 can be maintained by closing off the conduit 12, for example by means of a valve, or alternatively by connecting the conduit 12 to a pump or a depressed-atmosphere storage vessel.

It will be appreciated that the fit between the two elongate seal members 1 and 8 may be such that a satisfactory seal is maintained between them even if a long-term depression is not maintained in the void 2. This is due to the fact that engagement between the seal members is facilitated by the production of an elevated pressure in the void 2, so that in order to separate the members 1 and 8 it will again be necessary to produce a positive pressure in the void.

A second embodiment of the invention is shown in FIG. 4 which will only be described insofar as it differs from that of FIGS. 1 to 3. Instead of the substantially rectangular profile of the elongate seal member 1 of FIGS. 1 to 3, the member 1 is formed integrally with a jointing flange 14 similar to the jointing flange 11 of the seal member 8. This embodiment is thus suitable for use in conjunction with a structure comprising two flexible elements, for example, of impermeable sheet material, each elongate seal member being joined to a flexible element by means of its respective jointing flange. In addition, the void 2 is modified to accommodate side-entry of the conduit 12. FIG. 5 shows two flexible pipe sections P sealingly and flexibly interconnected by a sealing device as shown in FIG. 4.

Referring now to FIGS. 6 to 8, a third embodiment of the invention is shown which is similar to that of FIGS. 1 to 3, the female seal member 1 again being a close fit in an elongate channel 15 formed in a rigid or semi-rigid base member 16. In addition to the features described with reference to FIGS. 1 to 3, the seal member 1 is formed with notches 17 and ribbed projections 18. The notches 17 are adapted to fit over projecting rims 19 along the edges of the channel 15, and the seal member 1 is thus retained within the channel 15 by virtue of the engagement of the rims 19 in the notches 17, the arms 3 pivoting about the rims as the void 2 is inflated and deflated. When a depression is applied to the void 2, as shown in FIG. 8, the ribbed projections 18 are pressed against the side walls of the channel 15, thus assisting in retaining the seal member 1 in the channel.

In an alternative embodiment (not illustrated) the female seal member 1 retracts entirely within the channel 15 when a vacuum is drawn in the void 2, so that the interengaged seal members 1 and 8 are locked within the channel until a positive pressure is applied to the void 2 to release them.

FIG. 9 illustrates an air-tight storage facility comprising a rigid or semi-rigid impermeable base member 16 already mentioned, and a flexible impermeable membrane M which covers one or more articles A placed on the base 16 for air-tight storage, the base member and the membrane being sealingly interconnected by a sealing device as shown in either FIGS. 1 to 3 or FIGS. 6 to 8. A valve V in the conduits 12 holds the sub-atmospheric pressure in the void 2.

A fourth embodiment of the invention is shown in FIGS. 10 to 12. In this embodiment, one elongate seal member 20 is arranged in a channel 21 in a rigid or semi-rigid base 22. The seal member 20 has a void 23 extending the length thereof, having relatively thick side walls 24, 25 on each side. The upper ends of the side walls 24, 25 are bridged by a crankable wall 26. Notches 27, 28 are provided on the inside of wall 26 at the points at which the wall 26 is connected to the side walls 24, 25 respectively. A third notch 29 is provided in the wall 26 on the outside thereof and substantially at its midpoint. The notches produce points in the walls of the member of reduced thickness, so that the walls tend to bend at the locations of the notches. At the base of the void 23 a raised portion 30 is provided which acts as a stop to prevent downward movement of the crankable wall 26 beyond the over-centre position shown in FIG. 12. The side wall 25 is provided with a rounded lip 31 at its upper end and a rounded notch 32 at its lower end, the lip 31 and notch 32 serving a similar function to the lips 6 and notches 7 of the previous embodiments. The base of the member 1 extends to 33 to the right hand wall 35 of the channel 21.

The other seal member 34 is adapted to be inserted between the side wall 25 and the wall 35, a recess 36 being provided on the member 34 for the reception of the lip 31. A conduit 12 is again for supplying positive or negative pressure to the void 23 through the base 22.

When a positive pressure is supplied to the void 23 the crankable wall 26 is deflected upwardly as shown in FIG. 11, the wall bending at the locations of the notches 27, 28, 29, thus drawing the side wall 25 and the lip 31 leftwardly as shown in the drawings, the wall 25 pivoting about the notch 32. The seal member 34 is then inserted between the walls 25 and 35, whereafter a depression is drawn in the void 23, to cause the crankable wall 26 to be drawn downwardly and to act as a compressive strut, forcing the wall 25 into firm contact with the member 34 and the lip 31 into the recess 36. The seal member 20 is arranged so that in the position of FIG. 12 the wall is in an over-centre position, engaging the raised portion 30, so that the seal member locks in the position shown in FIG. 12, regardless of whether or not a reduced pressure is maintained in the void 23. The seal member 34 will then only be released when a positive pressure is subsequently supplied to the void 23, forcing the member 20 to resume the position shown in FIG. 11.

It would of course be possible for the seal member 20 to be provided with a further side wall engaging the wall 35 of the channel and the seal member 34 then to be held between the wall 25 and the further wall rather than engaging the channel wall 35.

FIG. 13 is a view similar to FIG. 9 but illustrating the use of the sealing device of FIGS. 10 to 12 to provide an air-tight seal between base 22 and membrane M.

The embodiments of the invention described above can be utilised in a large number of ways. Thus, for example, either or both the structures joined together need not be of sealed form. Owing to the fact that the vacuum seal is intrinsic to the seal itself, no limitation is imposed on the contents or structure of the members joined by the seal. A jointing ring or band could be provided with, for example, a female seal member of the form shown in FIG. 4 at each axial end thereof. The band may be formed simply by providing two female seal members with a common jointing flange 14. Such a band could be used to join together, for example, two pipes or closed cylindrical members, the rims of which provide male seal members with or without the particular features of the male seal members described above.

What is claimed is:

1. A sealing device comprising two interengageable elongate seal members, of which at least one is flexible and has an internal void extending along the length thereof, said one member having a recess which is arranged to deform so as sealingly to engage the other seal member when said void is at least partially evacuated with the seal members interengaged.

2. A sealing device as claimed in claim 1, wherein the two seal members are arranged to interlock and thereby resist disengagement when they are interengaged but said one member is not deformed.

3. A sealing device as claimed in claim 2, wherein said one seal member is arranged to be disengaged from said other seal member by the application of a positive pressure in said void.

4. A sealing device as claimed in claim 1 wherein said one seal member is of female configuration comprising a pair of opposite side walls defining said recess therebetween for the reception of the other seal member of male configuration.

5. A sealing device as claimed in claim 4, wherein the said void in the one seal member is separated from the bottom of the said recess by a relatively thin wall interconnecting said opposite side walls, whereby evacuation of the void deforms said thin wall in buckling fashion so as to draw the side walls towards one another and into sealing engagement with said other seal member.

6. A sealing device as claimed in claim 5, wherein said relatively thin wall is thinnest midway between said side walls.

7. A sealing device as claimed in claim 4, wherein each of said side walls of said one seal member is formed with a terminal bulbous lip for sealing engagement in oppositely facing recesses of said other seal member.

8. A sealing device as claimed in claim 1, wherein said one seal member adopts an over-centre configuration when deformed by evacuation of said void, whereby the seal is wholly maintained when the depression in the void is released.

9. A sealing device as claimed in claim 1, wherein the said one seal member is adapted to be mounted in a channel in a base member of a storage container.

* * * * *